Patented May 8, 1951

2,552,247

UNITED STATES PATENT OFFICE 2,552,247

PREPARATION OF ORGANOPOLYSILOXANES

Wilbur J. Wormuth, Schenectady, N. Y., assignor to General Electric Company, a corporation of New York No Drawing. Application April 8, 1949,
Serial No. 86,393

10 Claims. (Cl. 260—448.2)

This invention is concerned with the preparation of organopolysiloxanes. More particularly, it relates to a method for increasing the viscosity of non-thermosetting silicones or organopolysiloxanes which comprises heating an organopolysiloxane whose viscosity it is desired to increase and which is substantially unstable at elevated temperatures with a linear organopolysiloxane containing two terminal

groups where R, R' and R'' are each an organic radical.

In Patnode application Serial No. 463,814, filed October 29, 1942, and assigned to the same assignee as the present invention, now U. S. Patent 2,469,888, there are disclosed and claimed liquid linear organopolysiloxanes containing terminal groups of the type described above. The presence of such terminal groups improves the heat stability of the organopolysiloxane. One of the methods for preparing organopolysiloxanes containing the aforementioned terminal triorganosilyl groups, such compositions being known as "chain-stoppered organopolysiloxanes," comprises heating a diorganopolysiloxane with a hexaorganodisiloxane, for example, hexamethyldisiloxane, in the presence of a small amount of a mineral acid such as sulfuric acid. Continued heating of the liquid organopolysiloxane will result in an increase in viscosity and in order to stop undesirable viscosity increases when the liquid organopolysiloxane is in use, it is necessary to remove the acid either by washing or by neutralization with bases. Such a procedure is expensive and often fails to remove the last critical traces of the acid.

Another method known for increasing the viscosity of liquid organopolysiloxanes, including chain-stoppered organopolysiloxanes, comprises heating the latter in the presence of an alkali-metal hydroxide, such as potassium hydroxide, until the desired viscosity is obtained. In this process again, at the end of the reaction, it is necessary to remove essentially all traces of the alkali-metal hydroxide in order to prevent undesirable instability at elevated temperatures of the organopolysiloxanes.

In addition to the foregoing disadvantages encountered in making organopolysiloxanes of increased viscosity, there is the additional advantage that it is difficult to control, within reasonable limits, the type of product obtained even though essentially identical conditions are employed in subsequent operations.

Moreover, no matter how much care is exercised in removing the catalyst or catalysts from the treated organopolysiloxane, there too often remain slight traces of the catalyst which under certain conditions, especially at very high temperatures, cause an undesirable added increase in viscosity. Finally, prior methods for making liquid organopolysiloxanes of increased viscosity could only be used to make an organopolysiloxane of a specific viscosity. When it became necessary to prepare an organopolysiloxane of different viscosity, it required the use of a new batch of ingredients with the attendant possible danger that the viscosity of the final product would not be the required one.

I have now discovered that the foregoing disadvantages can be obviated and other advantages realized in preparing liquid organopolysiloxanes of increased viscosity from organopolysiloxanes of lower viscosity by (1) forming a mixture of ingredients comprising (a) an organopolysiloxane containing an average of from about 1.9 to 2.0 organic groups per silicon atom and preferably, though not essentially, substantially free of organopolysiloxanes boiling below 250° C. when measured at normal pressures and (b) a liquid composition comprising a linear organopolysiloxane (including a mixture of linear organopolysiloxanes) having at least five silicon atoms in the polysiloxane chain and containing two terminal

groups where R, R' and R'' are each an organic radical and (2) heating the said mixture at an elevated temperature but below the decomposition point of the mixture under reduced pressure while at the same time removing the organopolysiloxanes present in the reaction mixture boiling below at least 250° C. when measured at normal pressures.

By means of my invention there is no necessity for removing any catalyst, the process is admirably suitable for continuous operation, and I am able to maintain outstanding control of both the process and the final product. In addition, my claimed invention can be employed to prepare organopolysiloxanes of varying viscosities over a wide range, and from one batch operation, it is possible to remove definitive cuts of organopolysiloxanes to correspond to any desired viscosity; moreover, any desired amount of a particular product of specified viscosity can be withdrawn at any time during my process.

As an additional advantage of my claimed process, I have found that the distribution of linear polymers and the average length of such linear polymers (i. e., organopolysiloxanes) is more uniform. This results in lower volatile losses at elevated temperatures and greater stability and dependability in use.

In accordance with a specific preferred embodiment of my invention, a liquid organopolysiloxane whose viscosity it is desired to increase, containing an average of from about 1.9 to 2.0, e. g., from 1.95 to 2.0, organic groups per silicon atom, is heated at elevated temperatures, preferably under reduced pressure, so as to remove substantially all the organopolysiloxanes boiling below 250° C. when measured at normal pressures. The method for accomplishing this may be varied, the purpose being to obtain a liquid organopolysiloxane which can be later treated at elevated temperatures sufficiently high in accordance with my claimed process while at the same time maintaining to as low a degree as possible the volatilization of low-boiling organopolysiloxanes.

This removal of low boilers from the organopolysiloxane containing an average of from 1.9 to 2.0 organic groups per silicon atom, which for brevity will hereinafter be referred to as the "non-stoppered" organopolysiloxane, will ordinarily remove some of the lower boiling cyclic diorganopolysiloxanes corresponding to the general formula [(R)₂SiO]ₙ where R is an organic radical and n is a whole number equal to at least 2 or 3. Usually such preliminary heating removes, in the case of methylpolysiloxanes (where R is a methyl group), most of the cyclic compounds containing up to where, for example, n equals from six to nine dimethylsiloxy units. It will, of course, be apparent to those skilled in the art that the amount of these low boiling materials removed in the preliminary heating of the non-stoppered organopolysiloxane may be varied within wide limits. If desired, this preliminary heating step may be omitted and the non-stoppered organopolysiloxane mixed with the chain-stoppered organopolysiloxane as described below, relying upon the later treatment to remove the low-boiling polysiloxanes. This necessitates greater lengths of time for obtaining the future increase in viscosity of the reacted or equilibrated final product.

The non-stoppered organopolysiloxane substantially free of the lower boiling organopolysiloxanes is then mixed with a liquid composition comprising a linear organopolysiloxane having at least five silicon atoms in the polysiloxane chain and containing two terminal

where R, R' and R'' each have the meaning above. For brevity, a liquid linear organopolysiloxane containing the aforementioned two terminal groups will hereinafter be referred to as "a chain-stoppered" organopolysiloxane.

Thereafter, the mixture of ingredients is heated at an elevated temperature sufficiently high to break siloxane linkages but below the decomposition point of the mixture. This heating is preferably conducted under reduced pressure during which time low-boiling organopolysiloxanes present or formed during the course of and at the temperature of the reaction are removed. Such heating may require, for instance, from 3 to 36 or more hours depending, for example, on the degree of viscosity desired, the type of chain-stoppered and non-stoppered polysiloxanes employed in the reaction, the amount of chain-stoppered organopolysiloxane present in the reaction mixture, the temperature at which the heating is conducted, etc.

The heating of the mixture of non-stoppered and stoppered organopolysiloxanes is preferably conducted in an inert atmosphere such as, e. g., nitrogen, carbon dioxide, etc., with the substantial exclusion of air or oxygen. Generally, I have found that as the ratio of organic groups to silicon atoms approaches and includes 2.0, the necessity for excluding oxygen or air decreases. Conversely, as the ratio of organic groups to silicon atoms approaches 1.90 or even 1.95, the necessity for using an inert atmosphere over the reacting mass becomes pronounced, and under such conditions best results are obtained using such an atmosphere to prevent discoloration of the product and to prevent an undesirable and too rapid increase in viscosity.

The liquid organopolysiloxane containing an average of from 1.9 to 2.0 organic groups per silicon atom, i. e., the non-stoppered organopolysiloxane, may comprise any one of the many organopolysiloxanes coming under this classification. Thus, such organopolysiloxanes may be obtained by the hydrolysis of hydrolyzable organo-substituted silanes followed by complete or partial condensation of the hydrolysis product. They may also be prepared by hydrolyzing mixtures of hydrolyzable organo-substituted silanes wherein the average number of organic groups to silicon atoms is within the ratio of from about 1.9 to 2.0. More specific directions for the hydrolysis of hydrolyzable organo-substituted silanes to form liquid organo-substituted organosiloxanes may be found, for instance, in Patnode applications Serial Nos. 463,813, now abandoned, 463,814 and 463,815, now abandoned, filed October 29, 1942, the foregoing applications being assigned to the same assignee as the present invention. Attention is also directed to the book, "Introduction to the Chemistry of the Silicones," by Eugene G. Rochow published by John Wiley and Sons (1946) for additional information as to methods for hydrolyzing hydrolyzable organosilanes and for other examples of non-stoppered as well as chain-stoppered organopolysiloxanes.

By the term "hydrolyzable organo-substituted silanes" is intended to mean derivatives of $SiH_4$ which contain hydrolyzable groups or radicals, e. g., halogens, amino groups, alkoxy, aryloxy, and acyloxy radicals, etc., in addition to the organic groups substituted directly on the silicon atom joined to the silicon by carbon-silicon linkages. Examples of such organic radicals are aliphatic radicals, including alkyl radicals (e. g., methyl, ethyl, propyl, butyl, isopropyl, amyl, decyl, etc.); alicyclic radicals (e. g., cyclopentyl, cyclohexyl, etc.); aryl radicals (e. g., phenyl, diphenyl, anthracyl, naphthyl, etc.); aralkyl radicals (e. g., benzyl, phenylethyl, etc.); alkaryl, e. g., tolyl, xylyl, etc.; heterocyclic radicals, etc., as well as hydrolyzable silanes containing two different organic radicals, e. g., methyl and phenyl radicals, etc., attached to the silicon atom. If desired, the above-mentioned radicals may also contain substituents substituted thereon, for instance, halogens, etc.

As a specific example for preparing the above-described non-stoppered organopolysiloxane, reference may be had to the preparation of, for instance, a methyl polysiloxane containing an average of from 1.9 to 2.0, e. g., from 1.95 to 2.0, methyl groups per silicon atom. Thus, dimethyldichlorosilane (or any diorganodihalogenosilane, for instance, diphenyldichlorosilane, etc.) is hydrolyzed with water in a manner described in any of the foregoing Patnode applications so as to give a minimum of low boiling cyclic compounds, for example, the trimer or tetramer of polymeric dimethylsiloxane. If desired, trifunctional hydrolyzable organosilanes, for example, methyltrichlorosilane, in a molar proportion (i. e., up to 10 molar per cent) sufficient to maintain the total methyl-to-silicon ratio between 1.9 and 2.0 may be added to the dimethyldichlorosilane prior to effecting hydrolysis thereof. Further directions for preparing non-stoppered liquid organopolysiloxanes may be found in the aforementioned book Introduction to the Chemistry of the Silicones by Eugene G. Rochow.

After formation of the non-stoppered organopolysiloxane, specifically, the above-mentioned methylpolysiloxane, the composition is heated, preferably at reduced pressure, to remove substantially most of the low boiling methylpolysiloxanes, for example, the cyclic methylpolysiloxanes boiling below 250° C. at 10 mm. It will, of course, be apparent to those skilled in the art that the amount of low boiler, i. e., lower boiling methylpolysiloxanes, removed may be varied within wide limits but that the more such lower boiling materials are removed, the less difficulty is encountered in later reaction of the non-stoppered organopolysiloxane with the chain-stoppered organopolysiloxane. A particular benefit derived from an efficient removal of the low boiling organopolysiloxanes is reflected in the shorter length of time required to effect the desired increase in viscosity of the organopolysiloxane employed in the practice of the invention.

The particular chain-stoppered organopolysiloxanes which are employed herein are more specifically described, disclosed and claimed in the aforementioned Patnode application Serial No. 463,814, which by reference is made an integral part of this specification. The aforementioned Patnode application adequately describes methods for making such chain-stoppered compositions. It will, of course, be understood, that instead of hexaorganodisiloxanes (e. g., hexamethyldisiloxane, etc.) other similar lower organopolysiloxanes, for instance, octamethyltrisiloxane, decamethyl tetrasiloxane, etc., maybe used in the preparation of the chain-stoppered organopolysiloxanes as the ingredient for imparting the chain-stoppering, i. e., the

groups to the final chain-stoppered product (where R, R' and R'' have the same meaning as given above) used in the practice of my invention.

I have found it preferable for purposes of economy and for the purpose of reducing the time within which the reaction may be considered complete to employ chain-stoppered organopolysiloxanes having at least five silicon atoms in the polysiloxane chain. Chain-stoppered liquid linear organopolysiloxanes substantially free of such low boiling linear polysiloxanes may be obtained by preliminarily heating the liquid organopolysiloxane described in the previously mentioned Patnode application Serial No. 463,814 so as to remove, for instance, by fractional distillation, such low boiling materials.

The non-stoppered and chain-stoppered organopolysiloxanes are thereafter charged to a distilling apparatus which is preferably provided with suitable means for agitation and with a source for reducing the pressure within the reaction vessel when the latter is heated.

The mixture of ingredients is then heated under substantially reduced pressure for lengths of time at temperatures of the order of from about 250° C. to below the decomposition points of the mixture. Since it has been found that at very high temperatures in the region from approximately 400° to 500° C. some decomposition of the product takes place, I have found it desirable to conduct the heating operation under reduced pressures, for example, at temperatures of the order of from about 250° to 350° C. at substantially reduced pressures of from about 5 to 50 mm. As will be obvious to those skilled in the art, higher or lower pressures and higher or lower temperatures are intended to be embraced within the scope of the invention, the particular temperature and pressure employed depending upon such factors as, for instance, the rate at which viscosity increase is desired, the amount of chain-stoppered organopolysiloxane present in the reaction mixture, the type of organopolysiloxanes employed in the reaction mixture, etc.

While heating the mixture of the stoppered and non-stoppered organopolysiloxane, the volatile organopolysiloxanes formed as a result of the breaking and reforming of polysiloxane linkages are removed by suitable means such as, for example, through a distilling column. Such removal of the volatile organopolysiloxanes, which in the main comprise cyclic organopolysiloxanes (which can be used again in making additional amounts of higher molecular weight stoppered and non-stoppered organopolysiloxanes), enables the viscosity of the reacting mass to increase at a reasonable rate. As the reaction proceeds, the reacting mixture can be tested to determine the viscosity thereof so as to permit stopping the heat treatment when the desired viscosity is obtained. Should the desired viscosity be obtained, and should it be desired to heat-treat only a portion of the reacting mass to obtain a composition of higher viscosity, the heat-treated mixture may be divided, and that portion thereof which it is desired to subject to further heat treatment may again be heated under the aforementioned conditions to give the material of increased viscosity.

The essential conditions for practicing my claimed invention involve the fact that the redistribution of siloxane linkages to form the compositions of increased viscosity can be effected at temperatures much above that to which the final product will be exposed when it will be used in any specific application. At the high temperatures of reaction the breaking and joining and breaking again of siloxane linkages occurs with relatively great rapidity to form the compositions having the greater viscosities. For this reason the final heat treatment is conducted under substantially reduced pressure in order to effect this redistribution of siloxane linkages while at the same time minimizing the decomposition of the reactants, and to remove the low-boiling organopolysiloxanes (e. g., the cyclic organopolysiloxanes) so as to permit a reasonable and practical rate of increase in viscosity of the reacting mass.

The relative proportions of the chain-stoppered and non-chain-stoppered organopolysiloxanes may be varied within wide limits and I do not intend to be limited to any particular ratio of ingredients. Generally, with larger amounts of the chain-stoppered organopolysiloxane the rate of viscosity increase will be smaller and the stability of the final product at elevated temperatures will be greater. Conversely, as the amount of chain-stoppered organopolysiloxane in the reaction mixture decreases, the viscosity increase will be greatly accelerated and the heat stability at elevated temperatures of the final product may be somewhat lower. Such factors as economy in conducting the reaction, and the ultimate use (such as for low or high temperature application) for which the final product is to be employed must be balanced to arrive at a suitable concentration of the chain-stoppered organopolysiloxane.

In most cases I have found it desirable, though not essential, to maintain the proportion of the chain-stoppered organopolysiloxane below 50 per cent, preferably from about 0.01 to 25, e. g., from 0.1 to 25 per cent, by weight, of the total weight of the stoppered and non-stoppered organopolysiloxane.

In order that those skilled in the art may better understand how my claimed invention may be practiced, the following example is given by way of illustration and not by way of limitation. All parts are by weight.

*Example*

Dimethyldichlorosilane containing approximately 0.3 mol per cent methyltrichlorosilane was hydrolyzed in the manner described previously to give a liquid methyl polysiloxane containing an average of about 1.997 methyl groups per silicon atom. This liquid was heated for about 4 hours at a temperature ranging from 200° to 300° C. under a vacuum of about 5 to 10 mm. with a slight nitrogen bleed. This heating was conducted in order to remove most of the low boiling cyclic polymeric dimethylsiloxanes. As a result of this distillation, there was obtained a residue which was approximately half of the starting material and which had increased from the original viscosity of about 30 centistokes to between 1500 to 2000 centistokes.

Another liquid methyl polysiloxane, this time a chain-stoppered methyl polysiloxane, was prepared by effecting reaction in the presence of a small amount of sulfuric acid, between the hydrolysis product of substantially pure dimethyldichlorosilane and hexamethyldisiloxane. In this manner there was obtained a liquid linear methyl polysiloxane having an average of slightly above two methyl groups per silicon atom and containing terminal silyl groups corresponding to the formula

This chain-stoppered polysiloxane was also subjected to a heat and vacuum distillation treatment until substantially all low molecular weight volatile methyl polysiloxanes containing less than five silicon atoms were removed and until the volatile amount remaining (i. e., when measured at 150° C. for 24 hours) was of the order of about 0.5 per cent or less.

To about 620 parts of the non-stoppered methyl polysiloxane was added approximately 26 parts of the chain-stoppered methyl polysiloxane. This mixture was placed in a distillation vessel equipped with a stirrer and means for distilling off volatile materials while the system was under reduced pressure. The vessel was then heated under a nitrogen atmosphere at a temperature of from 300–305° C. at an absolute pressure (i. e., vacuum) of from 7–10 mm. mercury. This heating was conducted for about 12 hours. During this high-temperature heating, long linear polymeric siloxanes were formed resulting in an increasingly viscous liquid. Along with the formation of the long linear polymers there were also formed volatiles of the dimethyl polysiloxane type, mostly cyclic dimethyl polysiloxanes which were removed with a slight nitrogen bleed. These volatiles amount to about 5% by weight of the total weight of the reactants.

It is desired to point out that the rate of viscosity increase depends to a great extent upon the speed with which these volatile components are removed from the equilibrating vessel. The use of lower pressures would have required less time in order to arrive at the viscosity desired, in this case, about 24,000 centistokes.

This high viscosity methyl polysiloxane was tested for heat stability and volatile losses. Such tests showed that the viscosity of this material rose only 1 per cent when the oil was heated at 200° C. for 222 hours. In addition, heating the viscous oil at 150° C. for 24 hours showed a zero per cent volatile loss. These outstanding properties of the oil produced in accordance with my claimed invention are to be contrasted with the properties of similarly viscous chain-stoppered methyl polysiloxanes prepared by other methods known heretofore, for example, using a catalyst to attain the increased viscosity. In the latter case heating of such materials at 200° C. for extended periods of time almost invariably leads to much greater increases in viscosity and in many cases results in gelation of the oil. Comparison of the viscosity increase of viscous liquid organopolysiloxanes prepared according to my claimed method with viscosity increases of liquid organopolysiloxanes free of chain-stoppering groups showed that the latter increased as much as 1250 per cent in viscosity when heated at 200° C. for 225 hours.

It will, of course, be understood, as pointed out previously, that instead of the liquid methyl polysiloxanes employed in the foregoing example, other types of non-stoppered and chain-stoppered organopolysiloxanes, e. g., methyl phenylpolysiloxane, many examples of which may be found in the aforementioned Patnode application, Serial No. 463,814, may also be employed without departing from the scope of the claimed invention. Such compositions or equivalents also include not only the use of various non-stoppered organopolysiloxanes, but also other chain-stoppered organopolysiloxanes containing terminal silyl groups corresponding to the formula

where R, R' and R'', in addition to being methyl groups, may also be the same or different organic radicals, for example, other alkyl radicals (for instance, ethyl, propyl, butyl, isobutyl, amyl, decyl, etc.), aryl radicals (for instance, phenyl, naphthyl, anthracyl, etc.), aralkyl radicals (for instance, benzyl, phenylethyl, etc.), alkaryl radicals (for example, tolyl, xylyl, etc.), cycloaliphatic (for instance, cyclopentyl, cyclohexyl, etc.), etc.; heterocyclic radicals, etc. The organic radical may contain non-reactive, substituents substituted thereon, as, for example, halogens.

The compositions prepared in accordance with my claimed invention because of their improved stability at elevated temperatures are eminently suitable for use in applications requiring materials having such properties as, for instance, as lubricants, hydraulic media, dielectric fluids, damping fluids, in the preparation of greases, etc. The ease with which any desired viscosity organopolysiloxane oil can be obtained together with the minimum of after-treatment of the obtained product, to render it heat stable, results in a material decrease in the handling operations and equipment required to prepare such compositions of matter. The volatile organopolysiloxanes resulting from the reaction of my invention can be employed again by converting them by suitable procedures to either the stoppered or non-stoppered organopolysiloxane variety.

What I claim as new and desire to secure by Letters Patent of the United States is:

1. The process which comprises (1) forming a mixture of ingredients comprising (a) an organopolysiloxane containing an average of from 1.9 to 2.0, inclusive, organic groups per silicon atom and (b) a liquid comprising a linear organopolysiloxane having at least 5 silicon atoms in the polysiloxane chain and containing two terminal

groups wherein the organic groups recited in (a), (b), and the organic groups for which R, R' and RR" stand, are bonded to the silicon atoms by carbon-silicon linkages and are selected from the class consisting of alkyl, aryl, aralkyl, alkaryl, and saturated cycloaliphatic radicals, and (2) heating the said mixture in the substantial absence of any rearrangement catalyst at an elevated temperature but below the decomposition point of the mixture under substantially reduced pressure while at the same time removing the organopolysiloxanes present in the reaction mixture boiling below at least 250° C. when measured at normal pressures.

2. The process for increasing the viscosity of a liquid organopolysiloxane which comprises (1) forming a mixture of ingredients comprising (a) a hydrocarbon-substituted polysiloxane containing an average of from 1.9 to 2.0 hydrocarbon groups per silicon atom and substantially free of hydrocarbon-substituted polysiloxanes boiling below 250° C. when measured at normal pressures and (b) a liquid comprising a linear organopolysiloxane having at least five silicon atoms in the polysiloxane chain and containing two terminal

groups wherein the hydrocarbon groups recited in (a), (b), and the organic groups for which R, R' and R" stand, are bonded to the silicon atoms by carbon-silicon linkages and are selected from the class consisting of alkyl, aryl, aralkyl, alkaryl, and saturated cycloaliphatic radicals, and (2) heating the said mixture in the substantial absence of any rearrangement catalyst in an inert atmosphere at an elevated temperature but below the decomposition point of the mixture under substantially reduced pressure while at the same time removing the organopolysiloxanes present in the reaction mixture boiling below at least 250° C. when measured at normal pressures.

3. The process for increasing the viscosity of a liquid organopolysiloxane which comprises (1) forming a mixture of ingredients comprising (a) a methyl polysiloxane containing an average of from 1.9 to 2.0 methyl groups per silicon atom and (b) a liquid comprising a linear organopolysiloxane having at least five silicon atoms in the polysiloxane chain and containing two terminal

groups wherein the methyl radicals recited in (a), the organic groups recited in (b), and the organic groups for which R, R' and R" stand, are bonded to the silicon atoms by carbon-silicon linkages, and the organic groups and R, R', and R" are selected from the class consisting of alkyl, aryl, aralkyl, alkaryl, and saturated cycloaliphatic radicals, and (2) heating the said mixture in the substantial absence of any rearrangement catalyst at an elevated temperature but below the decomposition point of the mixture under substantially reduced pressure while at the same time removing the organopolysiloxanes present in the reaction mixture boiling below at least 250° C. when measured at normal pressures.

4. The process for increasing the viscosity of a liquid organopolysiloxane which comprises (1) forming a mixture of ingredients comprising (a) a methyl phenyl polysiloxane containing an average of from 1.9 to 2.0 total methyl and phenyl groups per silicon atom and (b) a liquid comprising a linear organopolysiloxane having at least five silicon atoms in the polysiloxane chain and containing two terminal

groups wherein the methyl and phenyl groups of (a), the organic groups recited in (b), and the organic groups for which R, R' and R" stand, are bonded to the silicon atoms by carbon-silicon linkages, and the organic groups and R, R', and RR" are selected from the class consisting of alkyl, aryl, aralkyl, alkaryl, and saturated cycloaliphatic radicals, and (2) heating the said mixture in the substantial absence of any rearrangement catalyst under a substantially inert atmosphere at an elevated temperature but below the decomposition point of the mixture under substantially reduced pressure while at the same time removing the organopolysiloxanes present in the reaction mixture boiling below at least 250° C. when measured at normal pressures.

5. The process for increasing the viscosity of a liquid organopolysiloxane which comprises (1) forming a mixture of ingredients comprising (a) a hydrocarbon-substituted polysiloxane containing an average of from 1.9 to 2.0 hydrocarbon groups per silicon atom and substantially free of hydrocarbon-substituted polysiloxanes boiling below 250° C. when measured at normal pressures and (b) a liquid comprising a linear methyl polysiloxane having at least five silicon atoms in the polysiloxane chain and containing two terminal

groups wherein the hydrocarbon radicals recited in (a) and the methyl radicals recited in (b) are attached to the silicon atoms by carbon-silicon linkages, and the hydrocarbon groups are selected from the class consisting of alkyl, aryl, aralkyl, alkaryl, and saturated cycloaliphatic radicals, and (2) heating the said mixture in the substantial absence of any rearrangement catalyst at an elevated temperature but below the decomposition point of the mixture under substantially reduced pressure while at the same time removing the methyl polysiloxanes present in the reaction mixture boiling at least below 250° C. when measured at normal pressures.

6. The process for increasing the viscosity of a liquid organopolysiloxane which comprises (1) forming a mixture of ingredients comprising (a) a methyl polysiloxane containing an average of from 1.9 to 2.0 methyl groups per silicon atom and (b) a liquid comprising a linear methyl polysiloxane having at least five silicon atoms in the polysiloxane chain and containing two terminal

groups wherein all the methyl groups recited in (a) and (b) are attached to the silicon atoms by carbon-silicon linkages, and (2) heating the said mixture in the substantial absence of any rearrangement catalyst, while substantially excluding oxygen, at an elevated temperature but below the decomposition point of the mixture under substantially reduced pressure while at the same time removing the methyl polysiloxanes present in the reaction mixture boiling below at least 250° C. when measured at normal pressures.

7. The process for increasing the viscosity of a liquid organopolysiloxane which comprises (1) forming a mixture of ingredients comprising (a) an alkyl aryl polysiloxane containing an average of from 1.9 to 2.0 total alkyl and aryl groups per silicon atom and substantially free of alkyl aryl polysiloxanes boiling below 250° C. when measured at normal pressures and (b) a liquid comprising a linear methyl polysiloxane having at least five silicon atoms in the polysiloxane chain and containing two terminal

groups, and (2) heating the said mixture in the substantial absence of any rearrangement catalyst in a substantially inert atmosphere at an elevated temperature but below the decomposition point of the mixture under substantially reduced pressure while at the same time removing the organopolysiloxanes present in the reaction mixture boiling below at least 250° C. when measured at normal pressures.

8. The process for increasing the viscosity of a liquid organopolysiloxane which comprises (1) forming a mixture of ingredients comprising (a) a methyl phenyl polysiloxane containing an average of from 1.9 to 2.0 total methyl and phenyl groups per silicon atom and (b) a liquid comprising a linear methyl polysiloxane having at least five silicon atoms in the polysiloxane chain and containing two terminal

groups, and (2) heating the said mixture in the substantial absence of any rearrangement catalyst in a substantially inert atmosphere at an elevated temperature but below the decomposition point of the mixture under substantially reduced pressure while at the same time removing the organopolysiloxanes present in the reaction mixture boiling below at least 250° C. when measured at normal pressures.

9. The process for increasing the viscosity of a liquid organopolysiloxane which comprises (1) preparing a mixture of ingredients comprising (a) a methyl polysiloxane containing an average of from 1.95 to 2.0 methyl groups per silicon atom and substantially free of methyl polysiloxanes boiling below 250° C. when measured at normal pressures and (b) from 0.1 to 25 per cent, by weight, based on the weight of (a) of a liquid composition comprising at least one linear organopolysiloxane having a least five silicon atoms in the polysiloxane chain and containing two terminal

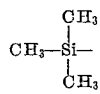

groups wherein the methyl radicals recited in (a) and the organic radicals recited in (b) are bonded to the silicon atoms by carbon-silicon linkages, and the organic radicals are selected from the class consisting of alkyl, aryl, alkaryl, aralkyl, and saturated cycloaliphatic radicals, and (2) heating the said mixture in the substantial absence of any rearrangement catalyst in a substantially inert atmosphere under substantially reduced pressure at an elevated temperature of the order of from about 250° C. to below the decomposition point of the mixture when said temperature is measured at normal pressures while at the same time removing the methyl polysiloxanes present in the reaction mixture boiling below at least 250° C. when measured at normal pressures.

10. The process for increasing the viscosity of a liquid organopolysiloxane which comprises (1) forming a mixture of ingredients comprising (a) a methyl phenyl polysiloxane containing an average of from 1.95 to 2.0 total methyl and phenyl groups per silicon atom and substantially free of methyl phenyl polysiloxanes boiling below 250° C. when measured at normal pressures and (b) from 0.1 to 25 per cent, by weight, based on the weight of (a) of a liquid composition comprising a linear polysiloxane having at least five silicon atoms in the organopolysiloxane chain and containing two terminal

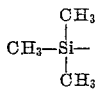

groups wherein the methyl and phenyl groups recited in (a) and the organic groups recited in (b) are attached to the silicon atoms by carbon-silicon linkages, and the organic groups are selected from the class consisting of alkyl, aryl, aralkyl, alkaryl, and saturated cycloaliphatic radicals, and (2) heating the said mixture in the substantial absence of any rearrangement catalyst in an inert atmosphere under substantially reduced pressure at an elevated temperature of the order of about 250° C. but below the decomposition point of the mixture when the temperature is measured at normal pressures, while at the same time removing the organopolysiloxanes present in the reaction mixture boiling below at least 250° C. when measured at normal pressures.

WILBUR J. WORMUTH.

REFERENCES CITED

The following references are of record in the file of this patent:

UNITED STATES PATENTS

| Number | Name | Date |
| --- | --- | --- |
| 2,441,098 | Hyde | May 4, 1948 |
| 2,468,869 | Daudt | May 3, 1949 |
| 2,469,888 | Patnode | May 10, 1949 |
| 2,469,890 | Patnode | May 10, 1949 |